INVENTOR
F. R. BIES
BY R. B. Ardis
ATTORNEY 3,566,314

CRYSTAL BAND-PASS FILTER WITH CONTROLLED ATTENUATION BETWEEN PASSBANDS

Frank R. Bies, Atkinson, N.H., assignor to Bell Telephone Laboratories, Incorporated, Murray Hill and Berkeley Heights, N.J., a corporation of New York
Filed Feb. 27, 1968, Ser. No. 708,612
Int. Cl. H03h 9/32
U.S. Cl. 333—72 6 Claims

ABSTRACT OF THE DISCLOSURE

In a crystal filter having a plurality of passbands, resistances of predetermined value as derived from and related to specific circuit parameters are inserted in series and in parallel with the crystal units to maintain the passbands and the attenuation between the passbands flat and constant and to hold the attenuation ratio between all of the passbands and the regions outside of the passbands at a fixed, predetermined level.

BACKGROUND OF THE INVENTION

This invention relates to piezoelectric crystal band-pass filters and, more specifically, to piezoelectric crystal band-pass filters which have flat attenuation characteristics and which maintain a constant attenuation ratio between the passbands and the regions outside of the passbands.

In certain electronic circuit applications such as, for instance, telephone transmission systems, band-pass filters are required to select intelligence which is within predetermined, narrow frequency bands. In order to obtain a high degree of selectivity, piezoelectric crystals have been incorporated advantageously into such band-pass filters.

In the application of such crystal band-pass filters their high degree of selectivity has heretofore been emphasized without consideration of the flatness of and the relative attenuation level between the passbands and the regions outside of the passbands.

In certain transmission circuits it is, however, extremely important to establish and maintain flat attenuation characteristics of and predetermined attenuation ratios between the transmission levels of the passbands and the transmission levels outside of the passbands.

A primary object of the invention is to increase the versatility of piezoelectric crystal band-pass filters.

A further object of the invention is to establish a fixed and constant attenuation ratio between the transmission levels in the passbands and outside of the passbands of piezoelectric crystal band-pass filters.

Still another object of the invention is to establish flat and constant transmission characteristics in the passbands and the regions outside of the passbands of a piezoelectric crystal filter.

SUMMARY OF THE INVENTION

To fulfill these objects the invention provides resistances of predetermined relationships to the parameters of the crystal circuit in series and in parallel with the piezoelectric crystals in the arms of a crystal lattice filter, thereby establishing predetermined, fixed, flat, and constant attenuation characteristics of and relationships between the passbands and the regions outside of the passbands of such band-pass crystal filter.

More specifically, in one embodiment of the invention several lattice sections are coupled together in a hybrid-type crystal filter to form a multi-band band-pass filter. Series resistances specifically related to the crystal parameters are inserted in series with the individual crystal units and parallel resistances are connected across the crystal/resistor combinations to obtain the required filter characteristics. In order to allow compensation for component and manufacturing variations at least one of the series resistors in each of the bands is made adjustable. The resulting filter exhibits the required flat attenuation characteristics together with the necessary attenuation ratios between the transmission level within and outside of the passbands.

DETAILED DESCRIPTION

Figure 1:
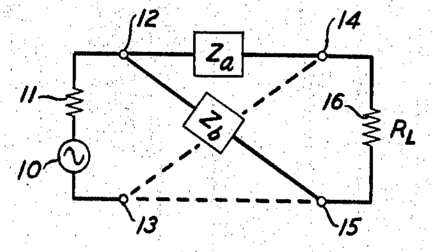
FIG. 1 illustrates an embodiment of the present invention in which the disclosed series and parallel resistances are incorporated in a symmetrical lattice network.

In the embodiment of the present invention illustrated in FIG. 1 a voltage source 10 having an internal resistance 11 is connected across the input terminals 12 and 13 of a symmetrical lattice network comprising impedance branches $Z_a$ and $Z_b$. Series impedance branches $Z_a$ are connected from one of the input terminals 12 and 13 to a corresponding output terminal 14 and 15, respectively. Diagonal impedance branches $Z_b$, on the other hand, are connected from one of the input terminals 12 and 13 to a diagonally opposite output terminal 15 and 14, respectively. A load resistor 16, in turn, is connected between output terminals 14 and 15.

Figure 2:
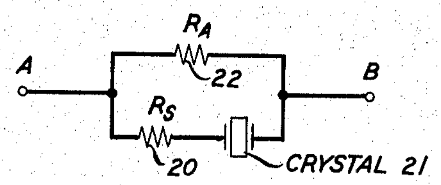
FIG. 2 is a schematic diagram of an impedance branch of the lattice filter embodiment of the invention shown in FIG. 1.

Each one of the impedance branches $Z_a$ and $Z_b$ of FIG. 1 takes the form illustrated in FIG. 2. That is, they comprise the series combination of resistor 20 having a resistance $R_S$ and piezoelectric crystal 21 connected between terminals A and B, and a resistor 22 having a resistance $R_A$ connected directly between terminals A and B in parallel with the series combination of resistor 20 and crystal 21.

Figure 3:
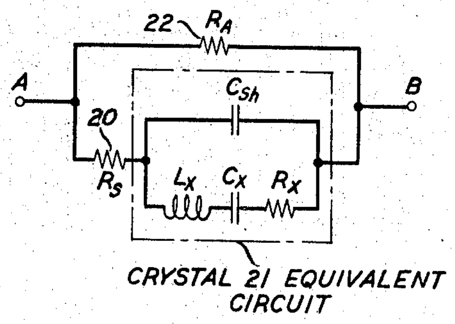
FIG. 3 is a schematic diagram of the impedance branch illustrated in FIG. 2 in which the piezoelectric crystal has been replaced by its equivalent circuit in terms of lumped inductance, resistance, and capacitance.

In order to facilitate the proper design of the band-pass filter it is helpful to represent crystal 21 of FIG. 2 by its equivalent circuit of inductance, capacitance, and resistance. FIG. 3 is a schematic diagram of the impedance branch of FIG. 2 in which crystal 21 has been replaced by its equivalent circuit comprising the series combination of the crystal inductance $L_x$, the crystal capacitance $C_x$, and the crystal resistance $R_x$, all of which are paralleled by the crystal shunt capacitance $C_{sh}$.

Figure 4:
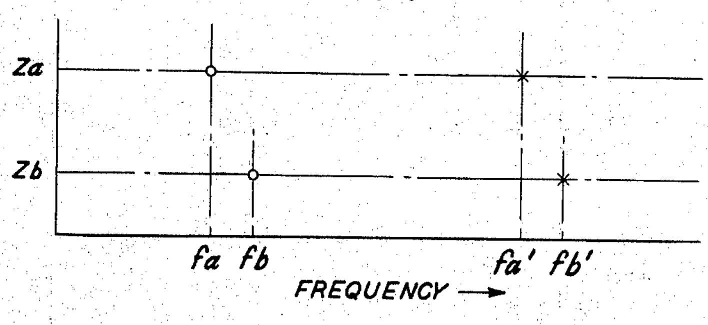
FIG. 4 is a pole-zero diagram of a narrow band-pass filter of the type illustrated in FIG. 1.
Figure 5:
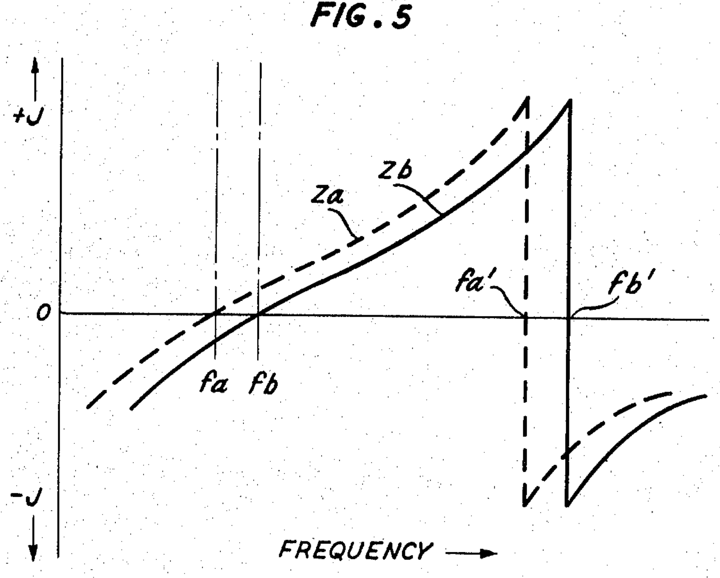
FIG. 5 illustrates the impedance characteristics of a narrow band-pass filter built in accordance with the present invention.

In the design of a narrow band-pass crystal filter of the type illustrated in FIG. 1, the crystals for the impedance branches $Z_a$ and $Z_b$ are chosen to satisfy the specific band-pass and cut-off frequency requirements of the particular circuit application. FIG. 4 is a pole-zero diagram and FIG. 5 illustrates the impedance characteristics of such narrow band-pass filter built in accordance with the invention. The lower cut-off frequency of the desired passband is the series resonance frequency $f_a$ of the series impedance branches $Z_a$ while the upper cut-off frequency is the resonance frequency $f_b$ of the diagonal impedance branches $Z_b$. The bandwidth of the desired passband consequently is equal to $$f_b - f_a = BW \quad (1)$$

A second passband between the frequencies $f_a'$ and $f_b'$ is generated as a result of the parallel resonance of the individual crystals. The effectiveness of the filter at the first passband about frequencies $f_a$ and $f_b$ and the effective elimination of the second passband about frequencies $f_a'$ and $f_b'$ is assured by terminating the filter in an appropriate load impedance $R_L$. That is, the filter network is terminated in a low load impedance $R_L$ to match the characteristic impedance $Z_o$ of the filter at midband frequency $f_m$, where the characteristic impedance $Z_o$ at $f_m$ is given by the following equation:

$$Z_o @ f_m \cong 2\pi L_x (f_b - f_a) \quad (2)$$

The characteristic impedance $Z_0'$, at the midband frequency $f_m'$ about the second passband at frequencies $f_a'$ and $f_b'$ is much higher than $Z_o$ and is given by the equation:

$$Z_o' @ f_m' \cong \frac{\Delta f + \frac{\Delta f^2}{2 f_m'}}{\pi C_{sh} f_a' (f_b' - f_a')} \quad (3)$$

where $$Z_o' \gg Z_o \quad (4)$$

In Equation 3 $\Delta f$ is the difference between the midband frequencies $f_m$ and $f_m'$ and $C_{sh}$ is the shunt capacitance of the crystal.

As a consequence of the high characteristic impedance $Z_o'$ and the low terminating impedance $R_L$ of the filter, the higher frequency band $f_b' - f_a'$ is subjected to a very high reflection loss and its effects are thereby effectively eliminated so that the single useful passband of the filter is located between the frequencies $f_a$ and $f_b$.

In the design of the band-pass filter of the present invention an effective figure of merit $Q_e$ of the crystal filter is used to compute the series resistance $R_S$ and the loss of the filter section, where $Q_e$ is determined from the crystal filter before the series resistor $R_S$ and before the parallel resistors $R_A$ are connected in the circuit. In order to optimize the design of the filter of the present invention the value of $Q_e$ is chosen to be approximately one-sixth to one-tenth of the average figure of merit Q of the individual crystals utilized in the filter. The selection of a relatively small value for $Q_e$ relative to the Q of the individual crystals makes it possible to insert a relatively large resistance $R_S$ in series with the individual crystals, thereby minimizing the effects of Q variations from crystal to crystal as a consequence of manufacturing difference or which arise from temperature changes. As a result, it is possible to accurately predict the attenuation of the filter section and to maintain it at a constant level as well.

The loss of the basic filter section may be computed from the following equation:

$$\text{Loss}_{(\text{Section})}(\text{db}) = \frac{k_1 f_m}{(f_a - f_b) Q_e} \quad (5)$$

in which $f_m$ is the midband frequency of the filter, $f_a$ and $f_b$ are the lower and upper cut-off frequencies, respectively, $Q_e$ is the effective figure of merit, and $k_1$ is a constant which is primarily related to the slope of the phase shift characteristics of the filter.

The attenuation characteristics of the individual passbands are primarily determined by the series resistor $R_S$ in the individual impedance branches of the filter. That is, by including the series resistor having a predetermined resistance $R_S$ which is specifically related to the circuit parameters of the filter the present invention assures that the attenuation characteristics of the individual passbands are flat, constant, and predictable. The series resistance $R_S$ is related to the midband frequency $f_m$, the crystal inductance $L_x$, the crystal resistance $R_x$, and the effective figure of merit $Q_e$ in accordance with the following equation:

$$R_S = \frac{2\pi f_m L}{Q_e} - R_x \quad (6)$$

As pointed out previously, the resistance $R_S$ is made to be relatively large by choosing a small value of $Q_e$, thereby rendering the filter effectively independent from parameter variations which result from manufacturing variations or which are due to temperature changes.

In prior art band-pass filter applications it has generally been sufficient to establish and maintain a minimum attenuation level outside of the passband without regarding variations in attenuation within the attenuation regions. That is, peaks of attenuation were permissible, for instance, as long as the minimum attenuation outside of the passband was maintained.

A primary feature of the present invention is the flat loss characteristic in the region outside of the passband of the filter. That is, the insertion of an attenuator pad in parallel with the series combination of resistor 20 and crystal 21 as represented by the resistor $R_A$ provides for a flat attenuation outside of the passband together with a fixed and constant attenuation ratio between the passband and he regions outside of the passband.

In order to optimize the design of the band-pass filter and to establish the required flat attenuation regions or loss shelves the parallel attenuation pad represented by resistor 22 has been designed to have an impedance level several times larger than the impedance level $Z_o$ of the crystal section. The attenuation ratio between the passbands and the regions outside of the passbands, on the other hand, is primarily dependent upon and may be selected in accordance with the specific circuit requirements of the particular filter application.

The overall loss characteristics of the attenuation pad [$\text{Loss}_{(\text{Pad})}$] are determined by the loss of the composite filter at the midband frequency $f_m$ plus the attenuation ratio [$\text{Att.}_{(\text{Ratio})}$] between the passbands and the attenuation regions outside of the passabands as required for the particular circuit application. The loss at the midband frequency $f_m$ comprises three components; namely, the loss of the basic filter section [$\text{Loss}_{(\text{Section})}$] computed per Equation 5 plus a shunt loss [$\text{Loss}_{(\text{Shunt})}$] introduced by the attenuation pad minus a reflection loss [$\text{Loss}_{(\text{Reflection})}$] between the pad and the terminating impedance of the filter. That is, the overall loss characteristics of the attenuation pad may be computed in accordance with the following equation:

$$\text{Loss}_{(\text{Pad})}(\text{db}) = \text{Att.}_{(\text{Ratio})} + \text{Loss}_{(\text{Section})} + \text{Loss}_{(\text{Shunt})} - \text{Loss}_{(\text{Reflection})} \quad (7)$$

in which the shunt loss is computed as follows:

$$\text{Loss}_{(\text{Shunt})} = 2\left[20 \log_{10}\left|\frac{R+1}{R}\right|\right] \quad (8)$$

and in which the reflection loss is equal to:

$$\text{Loss}_{(\text{Reflection})} = 20 \log_{10} \frac{R_p + R_f}{\sqrt{4 R_p R_f}} \quad (9)$$

with $$R = 2\frac{R_p}{R_f} \quad (10)$$

where $R_p$ and $R_f$ are equal to the impedance levels of the pad and filter, respectively.

In order to make the filter of the present invention more flexible the series resistance $R_S$ and the attenuation pad $R_A$ may be made variable. The inclusion of such variable components makes it possible to adjust the filter to compensate for manufacturing variations, thereby providing for the exact filter characteristcs as required for the particular filter application.

Figure 6:
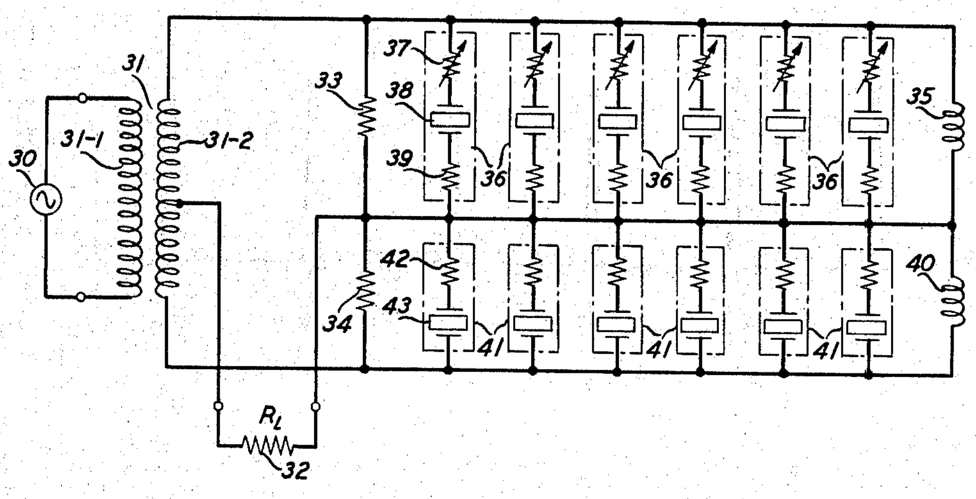
FIG. 6 is a schematic diagram of a hybrid-type multi-band band-pass filter incorporating the present invention.
Figure 7:
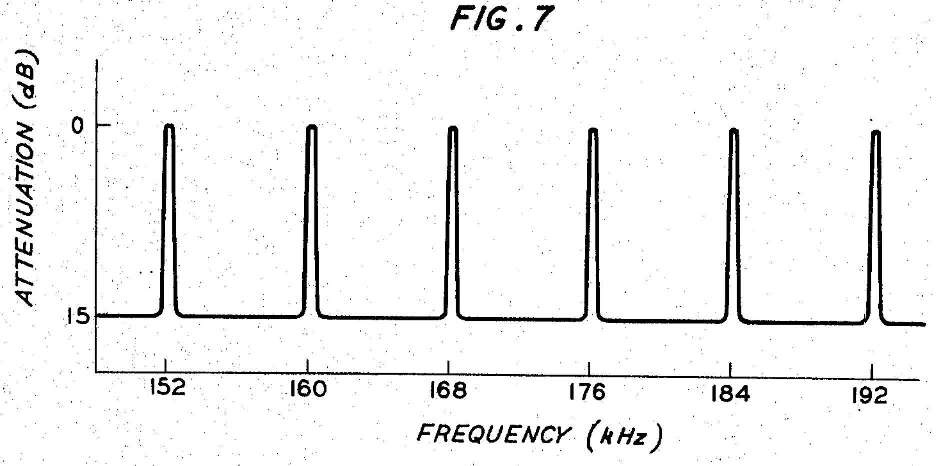
FIG. 7 illustrates the transmission characteristics of the band-pass filter shown in FIG. 6.

FIG. 6 is a schematic diagram of a particular multiband passband filter built in accordance with the principles of the present invention and which has the frequency selective characteristics as shown in FIG. 7. The filter shown in FIG. 6 has six very narrow passbands centered about the frequencies as indicated. FIG. 7 clearly illustrates the features of the present invention; namely, (1) the relative flatness of the passband regions as well as of the regions between the passbands; (2) the identical attenuation levels of the passbands as well as of the regions outside of the passbands; and (3) the fixed attenuation ratio between the passbands and the regions outside of the passbands.

The band-pass filter illustrated in FIG. 6 receives its input signal from a signal source 30 through the primary winding 31–1 and center-tapped secondary winding 31–2 of a hybrid-type transformer 31. A load resistor 32 has one terminal connected to the center tap of secondary winding 31–2, while the other terminal is returned to the respective opposite end terminals of the secondary winding through resistors 33 and 34, respectively. Resistor 33, in turn, is paralleled by an inductor 35 and six individual crystal circuits 36 each comprising the series combination of a variable resistor 37, piezoelectric crystal 38 and a fixed resistor 39. Resistor 34, on the other hand, is paralleled by an inductor 40 and six individual crystal circuits 41 each comprising the series combination of a fixed resistor 42 and a crystal 43.

The band-pass filter illustrated in FIG. 6 is the hybrid filter equivalent of six cascaded symmetrical lattice filter sections each of which has been designed in accordance with the principles of the present invention. The conversion from the standard symmetrical lattice to its hybrid equivalent is a practice well known in the art of filter design as disclosed, for instance, on page 235 of the fourth edition of "Reference Data for Radio Engineers" published in 1957 by the International Telephone and Telegraph Corporation. In the embodiment of the invention of FIG. 6 resistors 33 and 34 take the place of the attenuation pads of the individual crystal sections to provide for the required attenuation ratio between the passbands and the attenuation regions. For each of the passbands one set of two crystal sections 36 and 41 co-operate to establish the required bandwidth for that particular passband. The respective crystals 38 and 43 are selected to have the necessary upper and lower cut-off frequency, respectively, and the respective resistors 37, 39, and 42 combine to furnish the needed series resistance for the specific passband. Series resistor 37 is made variable to allow compensation for circuit variations, thereby assuring accurate passband performance characteristics. Shunt inductors 35 and 40, on the other hand, serve to cancel the shunt capacitance effects of the respective crystals in parallel with the particular inductor over the frequency range of interest. FIG. 7 illustrates the resulting filter performance, characterized by the flat passbands and attenuation regions as well as by the fixed and predetermined attenuation ratio between the passbands and the attenuation regions.

It is to be understood that the above-described arrangements are illustrative of the application of the principles of the invention. Numerous other arrangements may be devised by those skilled in the art without departing from the spirit and scope of the invention.

I claim:

1. A band-pass crystal filter section of lattice configuration comprising a pair of series arms and a pair of shunt arms, each of said series and shunt arms comprising the series combination of a piezoelectric crystal and a resistor, and an attenuator directly shunting said series combination of crystal and resistor, said resistor having a resistance value $R_S$ which is at least several times larger than the series resistance of said crystal and which is related to the midband frequency $f_m$ and the effective figure of merit $Q_e$ of the crystal filter section, and the inductance L and the series resistance $R_x$ of the crystal according to the formula $$R_S=\frac{2\pi f_m L}{Q_e}-R_x$$

to optimize the passband characteristics of said band-pass crystal filter, the attenuation characteristics of said shunting attenuators fixing theattenuation differential between the passband and the regions outside of the passband and holding the attenuation ratio between the passband and the regions outside of the passband at a substantially constant level.

2. A band-pass filter in accordance with claim 1 in which a plurality of said filter sections of lattice configuration are connected in cascade, each of said filter sections having a different midband frequency $f_m$ to provide a plurality of passbands for said band-pass filter

3. A hybrid-type band-pass filter comprising a pair of input terminals and a pair of output terminals, a hybrid transformer having a primary winding and a center-tapped secondary winding, at least two piezoelectric crystals and at least two resistors, said primary winding being connected to said pair of input terminals to receive an input signal applied to said band-pass filter, said center-tap being connected to one of said output terminals, each end of said secondary winding being connected to the other of said output terminals through a respective series combination of one of said crystals and one of said resistors, whereby the resonance frequencies of said crystals determine the passband of said filter, each of said series resistors having a resistance value which is at least several times larger than the series resistance of the crystal connected in series with it to render the passband characteristics of said filter substantially flat and constant, and two attenuators, each of said attenuators directly shunting one of said series combinations of said resistors and said crystals to determine the attenuation differential between the passband and the attenuation regions outside of said passband, whereby the attenuation ratio between said passband and said attenuation regions is held at a substantially fixed, flat, and constant level.

4. A band-pass filter in accordance with claim 3 in which each of said series resistors has a resistance value $R_S$ which is related to the midband frequency $f_m$ and the effective figure of merit $Q_e$ of the respective crystal filter section, and the inductance L and the series resistance $R_x$ of the crystal according to the formula $$R_S=\frac{2\pi f_m L}{Q_e}-R_x$$

to optimize the passband characteristics of said band-pass filter.

5. A band-pass filter in accordance with claim 4 which includes a pair of inductors having one terminal each connected together and to the juncture of said attenuators and having their other terminals individually connected to one end of said secondary winding, said inductors each having an inductance value sufficient to cancel the shunt capacitance of said crystals, thereby assuring substantially flat response characteristics in the attenuation regions of said filter over the frequency range of interest.

6. A band-pass filter in accordance with claim 5 in which at least one of the resistors of said series resistor-crystal combinations has an adjustable resistance value to optimize the passband characteristic of said filter.

References Cited

UNITED STATES PATENTS

| | | | |
|---|---|---|---|
| 3,170,120 | 2/1965 | Jansen et al. | 330—117 |
| 3,461,407 | 8/1969 | Ruggles et al. | 333—6 |
| 3,426,300 | 2/1969 | Chun-Ho | 333—72 |
| 3,009,120 | 11/1961 | Robson | 333—72 |
| 3,344,369 | 9/1967 | Bies et al. | 333—72 |

HERMAN KARL SAALBACH, Primary Examiner

C. BARAFF, Assistant Examiner

U.S. Cl. X.R.

330—174